United States Patent
Schierling (10) Patent No.: US 7,301,736 B2
(45) Date of Patent: Nov. 27, 2007

(54) METHOD AND DEVICE FOR SHUTTING DOWN A DRIVE WITH A MATRIX CONVERTER DURING A POWER OUTAGE

(75) Inventor: Hubert Schierling, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 859 days.

(21) Appl. No.: 10/762,755

(22) Filed: Jan. 16, 2004

(65) Prior Publication Data

US 2004/0150266 A1 Aug. 5, 2004

Related U.S. Application Data

(63) Continuation of application No. PCT/DE02/02508, filed on Jul. 8, 2002.

(30) Foreign Application Priority Data

Jul. 19, 2001 (DE) ................ 101 35 337

(51) Int. Cl.
*H02H 5/10* (2006.01)
(52) U.S. Cl. .............. 361/23; 361/1; 361/88; 361/92; 307/130; 307/31; 307/112; 340/654; 318/801
(58) Field of Classification Search ............ 361/1, 361/88, 92, 23; 307/130, 112, 31; 318/801
See application file for complete search history.

(56) References Cited

U.S. PATENT DOCUMENTS

| | | | | |
|---|---|---|---|---|
| 4,806,841 A | * | 2/1989 | Lee et al. ............. | 322/29 |
| 5,198,970 A | * | 3/1993 | Kawabata et al. ..... | 363/37 |
| 5,325,034 A | * | 6/1994 | Reynolds et al. ...... | 318/782 |
| 5,949,672 A | * | 9/1999 | Bernet .................. | 363/159 |
| 5,982,645 A | * | 11/1999 | Levran et al. ......... | 363/37 |
| 6,058,028 A | * | 5/2000 | Czerwinski ........... | 363/44 |
| 6,130,832 A | * | 10/2000 | Julian .................. | 363/127 |
| 6,166,930 A | * | 12/2000 | Czerwinski ........... | 363/44 |
| 6,496,343 B2 | * | 12/2002 | Mahlein et al. ....... | 361/91.1 |
| 6,519,170 B2 | * | 2/2003 | Lacaze et al. ......... | 363/152 |
| 2003/0052544 A1 | * | 3/2003 | Yamamoto et al. .... | 307/66 |

FOREIGN PATENT DOCUMENTS

DE 200 04 437 U 6/2000

* cited by examiner

*Primary Examiner*—Rita Leykin
(74) *Attorney, Agent, or Firm*—Henry M. Feiereisen; Ursula B. Day (57) ABSTRACT

A method and a device for shutting down a drive during a power outage are disclosed. The method and device include a matrix converter, several commutation capacitors on the power line side, a switch unit on the power line side and a resistor unit. During a power outage, the matrix converter is immediately disconnected from the power supply, and the resistor unit is connected to the input terminals of the matrix converter in such a way that the amplitude of a voltage applied to the resistor unit equals the amplitude of an actual capacitor voltage space vector, and the speed setpoint is set to zero. This enables a drive with a matrix converter to be shut down during a power outage by way of a pulsed resistor.

25 Claims, 7 Drawing Sheets

METHOD AND DEVICE FOR SHUTTING DOWN A DRIVE WITH A MATRIX CONVERTER DURING A POWER OUTAGE

CROSS-REFERENCES TO RELATED APPLICATIONS

This application is a continuation of prior filed copending PCT International application No. PCT/DE02/02508, filed Jul. 8, 2002, which designated the United States and on which priority is claimed under 35 U.S.C. §120, the disclosure of which is hereby incorporated by reference.

This application claims the priority of German Patent Application, Serial No. 101 35 337.5, filed Jul. 19, 2002, pursuant to 35 U.S.C. 119(a)-(d), the disclosure of which is incorporated herein by reference.

BACKGROUND OF THE INVENTION

The present invention relates to a method for shutting down a drive connected to a matrix converter during a power outage and a device for carrying out the method.

It is desirable in many drive applications, such as lifting devices, to shut down the drive(s) during a power outage in an orderly and reliable manner. With drives having a voltage intermediate circuit converter, it is sufficient to install in the voltage intermediate circuit a suitably sized pulsed resistor which is connected electrically in parallel with the intermediate circuit capacitor. This pulsed resistor includes a series connection of a turn-off semiconductor switch and a resistor. Depending on the braking power of the motor, the average voltage of the resistor is regulated by controllably pulsing the turn-off semiconductor switch so that the power dissipated in the resistor corresponds to the instantaneous braking power of the motor.

Other converter topologies exist beside the "voltage intermediate circuit" converter topology, for example, the "matrix converter" converter topology. A matrix converter of this type is connected to the power line via an optional power line or electromagnetic compatibility filter. This power line filter is implemented, for example, by employing line chokes and commutation capacitors connected to the input terminals of the matrix converter. The commutation capacitors which can be connected in a Delta or Star configuration, are essential for the operation of the matrix converter. However, the chokes in the power lines may optionally be omitted.

Since the matrix converter does not include a voltage intermediate circuit, a conventional pulsed resistor can no longer be used for shutting down a drive when employing a matrix converter. Since certain drive applications require a safe shutdown, matrix converters cannot be used with these drive applications for powering the motors. Accordingly, these particular drive applications cannot employ the converter topology "matrix converter."

It would therefore be desirable and advantageous to provide an improved device for shutting down a drive during a power outage, which obviates prior art shortcomings and is able to specifically operate with a conventional matrix converter.

SUMMARY OF THE INVENTION

A prerequisite for the method of the invention is a controllable isolation point, such as a fast switch, located between the power line and the inputs of the matrix converter. This isolation point must provide an immediate disconnect during a determined power outage, so that the matrix converter can continue to operate.

According to one aspect of the invention, a method for shutting down a drive employing a matrix converter during a power outage is disclosed, wherein the matrix converter includes a plurality of power input side commutation capacitors, a power input side switching unit, and a resistor unit. The method includes the steps of immediately opening the power input side switching unit to disconnect the matrix converter from the power line in the event of a detected power outage, connecting the resistor unit to input terminals of the matrix converter in such a way that an amplitude of a voltage applied to the resistor unit is equal to an amplitude of a measured actual capacitor voltage space vector of the plurality of power input side commutation capacitors, and regulating a nominal rotation speed value of the drive towards zero.

According to the another aspect of the invention, the method includes the steps of immediately opening the power input side switching unit to disconnect the matrix converter from the power line in the event of a detected power outage, and controlling the matrix converter in braking mode in such a way that an amplitude of a voltage across the resistor unit is maximized.

When using the method according to the invention, the braking energy of the motor powered by the matrix converter can be converted into heat in a resistor unit, much like in a voltage intermediate circuit converter. An average voltage applied to the resistor unit is regulated so that the power dissipated in the resistor unit corresponds to the instantaneous braking power of the motor. The resistor unit includes at least one turn-off semiconductor switch for adjusting the voltage of the resistor unit. The method of the invention can associate the conventional pulsed resistor with the matrix converter.

According to yet another aspect of the invention, a device for shutting down a drive employing a matrix converter with a plurality of power input side commutation capacitors, a power input side switching unit, and a resistor unit during a power outage, includes a device for measuring an actual capacitor voltage space vector, a device for measuring an actual power line voltage space vector, a voltage control circuit, a switch, a power line voltage monitoring device, and a sequence controller. An input of the voltage control circuit is connected with an amplitude output of the device for measuring the actual capacitor voltage space vector and with an amplitude output of the device for measuring the actual power line voltage space vector. An output of the voltage control circuit is connected with a control input of the resistor unit, and an input of the sequence controller is connected with the power line voltage monitoring device. An input of the power line voltage monitoring device is connected with an amplitude output of the device for measuring the actual power line voltage space vector, and an output of the power line voltage monitoring device is connected with a control input of the switch and with a control input of the power input side switching unit. The output of the switch is connected via a ramp generator with an input that receives a nominal value of a rotation speed control circuit of a controller of the matrix converter.

According to still another aspect of the invention, the aforementioned device includes two switches instead of a single switch and a device for measuring an actual power line current space vector. The input of the voltage control circuit is connected to an amplitude output of the device for measuring the actual capacitor voltage space vector and with an amplitude output of the device for measuring the actual power line voltage space vector, The output of the voltage control circuit is connected via the second switch with a control input of a control unit of a controller of the matrix converter, wherein an output of the first switch is connected via a ramp generator with an input for providing a nominal value of a rotation speed control circuit of the controller of the matrix converter. An input of the sequence controller is connected with the power line voltage monitoring device, wherein an input of the power line voltage monitoring device is connected with an amplitude output of the device for measuring the actual power line voltage space vector. An output of the sequence controller is connected with a corresponding control input of the first and second switches.

The device for measuring the actual capacitor voltage space vector, the device for measuring the actual power line voltage space vector, and the device for measuring the actual power line current space vector are required for measuring the state of the power line and of the matrix converter. The device for measuring the actual power line voltage space vector is required only for initiating the braking mode. The voltage control circuit with the add-on resistor unit, the power input side switching unit, the switch(es) and the sequence controller are the only additional elements of the device.

The invention is also directed to a controller for a matrix converter incorporating the afore described devices. The device can be a signal processor.

Advantageous embodiments may include one or more of the following features. The amplitude of the voltage across the resistor unit can be adjusted by rotating a measured actual capacitor voltage space vector. Two orthogonal voltage components of an actual capacitor voltage space vector can be formed from capacitor voltages measured across the plurality of power input side commutation capacitors, and an amplitude and phase angle of the actual capacitor voltage space vector can be determined from a smoothed phase angle of the actual capacitor voltage space vector. The phase angle can be smoothed based on a nominal value of a power line frequency. Alternatively, two orthogonal voltage components of an actual power line voltage space vector can be formed from measured phase voltages, the orthogonal voltage components can then be transformed into polar components having an amplitude and phase angle, and the amplitude of the actual power line voltage space vector can be compared with a nominal amplitude value and a switch from normal mode to braking mode can be initiated based on a detected deviation. The phase angle of the actual power line voltage space vector can be smoothed using a nominal value of the power line frequency.

In addition, the amplitude of the actual capacitor voltage space vector can be compared with an amplitude of the actual power line voltage space vector to determine a deviation, and the resistor unit can be pulsed so that the deviation becomes zero.

Two orthogonal voltage components of an actual capacitor voltage space vector can be formed from capacitor voltages measured across the plurality of power input side commutation capacitors. The orthogonal voltage components are then transformed into polar components, and the amplitude of the actual capacitor voltage space vector is compared with a nominal amplitude value to determine a deviation. The actual capacitor voltage space vector is then rotated so that the deviation becomes zero.

The resistor in the resistor unit need not be pulsed, but can be fixedly connected between two phases by implementing the resistor unit as a series connection of a resistor and a contactor, whereby the terminals of the resistor unit are connected between two phases of the matrix converter. The input voltage of the matrix converter in braking mode is then a DC voltage and hence does not have the power line frequency. The DC voltage across the resistor is adjusted via the phase angle of the input voltage of the matrix converter. The input voltage is rotated by controlling the reactive current on the input side of the matrix converter.

With the proposed method, the matrix converter itself is used to adjust the voltage of the resistor unit, thereby obviating the need for additional turn-off semiconductor switches. The control unit of the matrix converter therefore requires only minimal modifications, and the resistor unit has only a single resistor which is connected between two input phases of the matrix converter by a simple contactor.

According to another advantageous feature of the device, the resistor unit comprises a series connection formed of a turn-off semiconductor switch and a resistor and having two terminals. The device further includes a plurality of diodes of which a first subset is connected with a first polarity between one terminal of the series connection and respective phase lines of the matrix converter, and a second subset is connected with an opposite polarity between the other terminal of the series connection and the respective phase lines of the matrix converter. Alternatively, the resistor unit can have three resistors, a turn-off semiconductor switch and a plurality of diodes. Each of the resistors is connected, on one hand, with a corresponding phase line of the matrix converter and, on the other hand, via a diode of a first polarity to a first terminal of the turn-off semiconductor switch, and via another diode of a second polarity to a second terminal of the turn-off semiconductor switch. The resistor unit can also be implemented as a series connection of a resistor and a contactor.

The device for measuring the actual capacitor voltage space vector can include a coordinate transformer with a vector rotator connected downstream. The device for measuring the actual power line voltage space vector can include two coordinate converters connected in series. A smoothing device may be connected downstream of the amplitude output of the device for measuring the actual capacitor voltage space vector. A vector phase control circuit can be connected downstream of the phase angle output of the device for measuring the actual power line voltage space vector.

The output of the voltage control circuit can be connected to a control input of the control device of the matrix converter, with a control valuable being applied in normal mode for adjusting the reactive current on the input side. of the matrix converter. The resistor unit can be simplified considerably by using the control variable input for the input-side reactive current of the controller of the matrix converter. No additional turn-off semiconductor switches are required.

BRIEF DESCRIPTION OF THE DRAWING

Other features and advantages of the present invention will be more readily apparent upon reading the following description of currently preferred exemplified embodiments of the invention with reference to the accompanying drawing, in which several embodiments of a device for carrying out the method of the invention are shown schematically for shutting down a drive with a matrix converter during a power outage, wherein.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned but have a different inventive entity. Both applications are unique, but incorporate the other by reference. Accordingly, the following U.S. patent application is hereby expressly incorporated by reference: "Method and Device for Bridging Brief Power Outages in a Matrix Converter".

Figure 1:
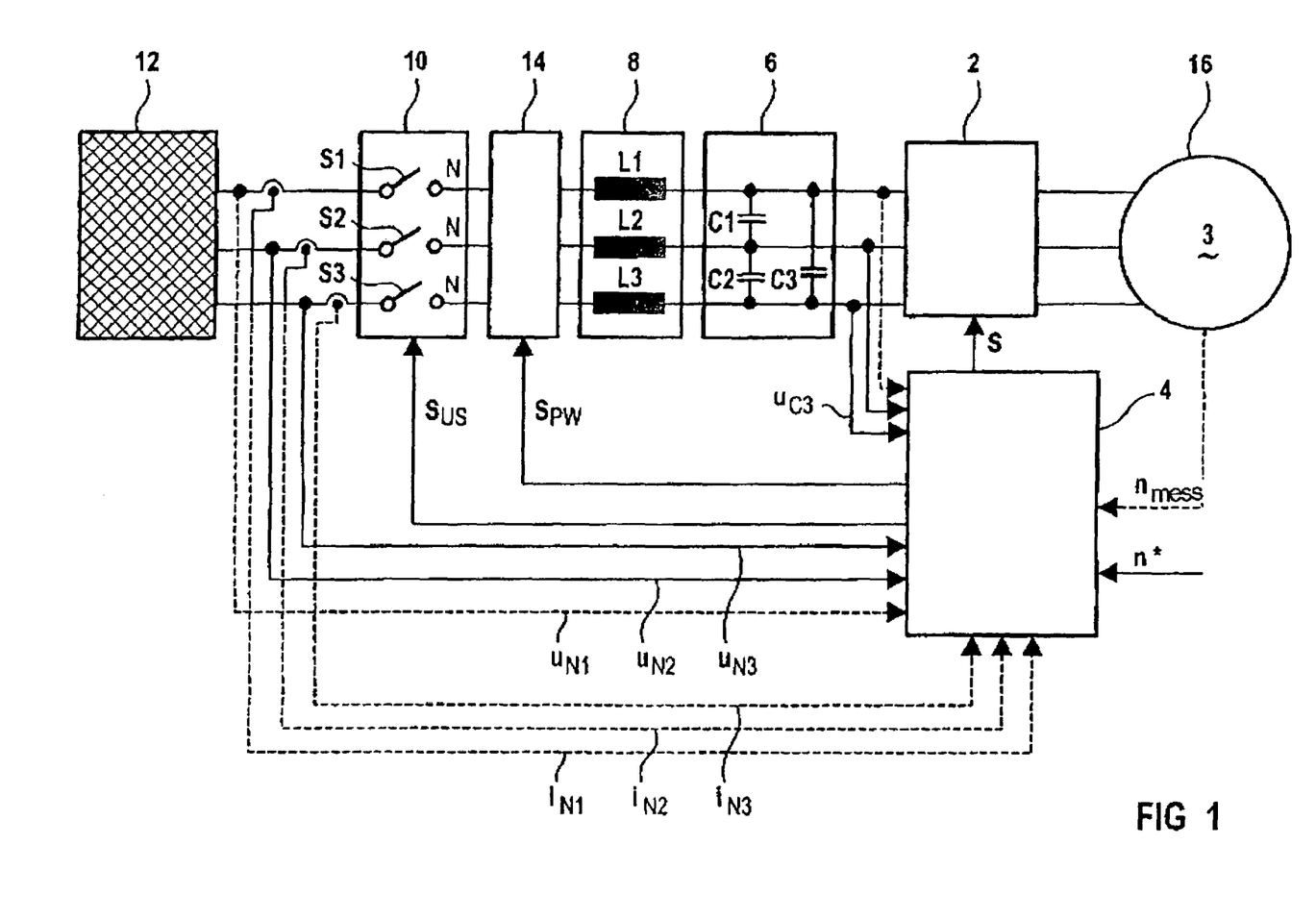
FIG. 1 is a block circuit diagram of a matrix converter with a resistor unit in accordance with the present invention.

Turning now to the drawing, and in particular to FIG. 1, there is shown a matrix converter 2, an associated controller 4, a commutation capacitor circuit 6, a choke circuit 8, a switching unit 10, a power supply 12, a resistor unit 14 and a driven motor 16. The output of the matrix converter 2 is connected to terminals of the motor 16, while the input of the matrix converter 2 is connected with the commutation capacitor circuit 6. The commutation capacitor circuit 6 includes three commutation capacitors C1, C2 and C3 which are connected in a Delta configuration. The commutation capacitors C1, C2 and C3 can also be connected in a Star configuration. The choke circuit 8 is connected before the commutation capacitor circuit 6, whereby the input of the choke circuit 8 can be connected to the power supply 12 via the switching unit 10. The choke circuit 8 has three inductances L1, L2 and L3, with each inductance being located in a corresponding power line. The switching unit 10 has three switches S1, S2 and S3 which can be used to disconnect the power lines between the power supply 12 and the choke circuit 8. The input of the resistor unit 14 is connected with the outputs of the switching unit 10, whereas the output of the resistor unit 14 is connected with the inputs of the choke circuit 8. The resistor unit 14 can also be connected between the choke circuit 8 and the commutation capacitor circuit 6. Embodiments of the resistor unit 14 are illustrated in FIGS. 2 to 4 and 7, wherein the controller 4 must be capable of controlling the input-side reactive current of the matrix converter 2 when employing the resistor unit 14 according to the embodiment of FIG. 7.

The controller 4 of the matrix converter 2 is supplied with at least two measured power line phase voltages $u_{N2}$ and $u_{N3}$. In addition, the measured phase voltage $u_{N1}$ can also be supplied. Also supplied to the controller 4 are the capacitor voltages $u_{C1}$, $u_{C2}$ and $u_{C3}$. A measured actual rotation speed value $n_{mess}$ and a predetermined desired rotation speed value $n^*$ are applied to two additional inputs. The output-side of the controller 4 is connected by control lines to the control inputs of the matrix converter 2, as well as with the resistor unit 8 and the switching unit 10. The capacitor voltages $u_{C1}$, $u_{C2}$ and $u_{C3}$ are measured at the input terminals of the matrix converter 2 and hence represent the input voltages of the matrix converter 2. The combination of the choke circuit 8 and the commutation capacitor circuit 6 forms a power line filter. The controller 4 can also be supplied with measured power line currents $i_{N1}$, $i_{N2}$ and $i_{N3}$ which are required for controlling the input-side reactive currents. The associated signal lines for this option are indicated by corresponding broken lines.

In normal mode, indicated by the letter "N", the switches S1, S2 and S3 of the switching unit 10 are closed, i.e., these switches S1, S2 and S3 are switched to the position N. The switches S1, S2 and S3 are implemented as fast switches, so that the matrix converter can be immediately disconnected from the power supply 12 in the event of a power outage. Fast switches S1, S2 and S3 can be implemented, for example, as semiconductor switches. The matrix converter can continue to operate without noticeable interruption when disconnected rapidly together with the input-side commutation capacitor circuit 6. A measured actual capacitor voltage space vector $\vec{u}_{Cmess}$ shortly before a power outage then corresponds to a measured actual capacitor voltage space vector $\vec{u}_{Cmess}$ shortly after the disconnection. In other words, in conjunction with the fast switches S1, S2 and S3 the actual input voltage space vector $\vec{u}_{Cmess}$ shortly after the disconnection has changed only insignificantly relative to an actual input voltage space vector $\vec{u}_{Cmess}$ anytime shortly before the disconnection. The actual input voltage space vector $\vec{u}_{Cmess}$ is the power line voltage space vector $\vec{u}_{netzmess}$ with the nominal amplitude $u_{Nenn}$.

Figure 2:
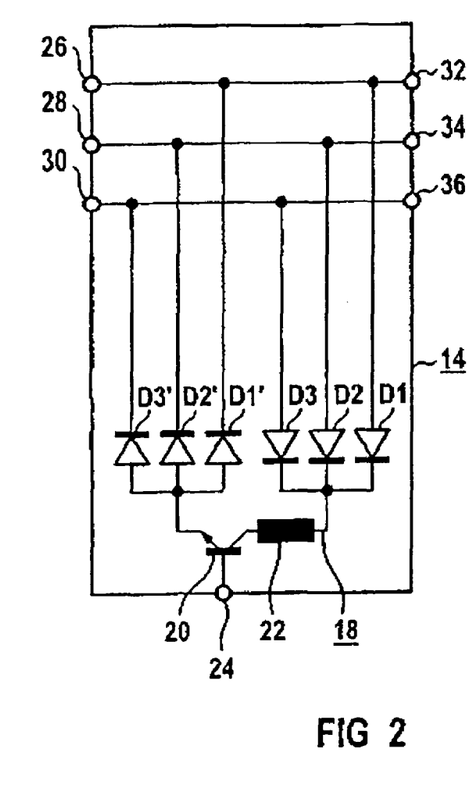
FIG. 2 is a circuit diagram of a first embodiment of the resistor unit of FIG. 1.

FIG. 2 shows a first embodiment of the resistor unit 14 of FIG. 1. The resistor unit 14 includes a turn-off semiconductor switch 20 and a resistor 22 connected in a series connection 18. The control input of the turn-off semiconductor switch 20 is connected with a control input 24 of the resistor unit 14. The terminals of the series connection 18, also referred to as pulsed resistor, are connected via corresponding diodes D1, D2, D3 and D1', D2', D3', respectively, with corresponding phase conductors, whereby each phase conductor connects a respective input 26, 28 and 30 of the resistor unit 14 with a corresponding output 32, 34 and 36 of the resistor unit 14. By connecting the pulsed resistor 18 with the phase conductors, a controllable AC voltage with the power line frequency is applied to the resistor 22 in braking mode B. The instantaneous braking power of the motor is dissipated during the braking mode across the single resistor 22. The corresponding resistor current is also conducted by the turn-off semiconductor switch 20.

Figure 3:
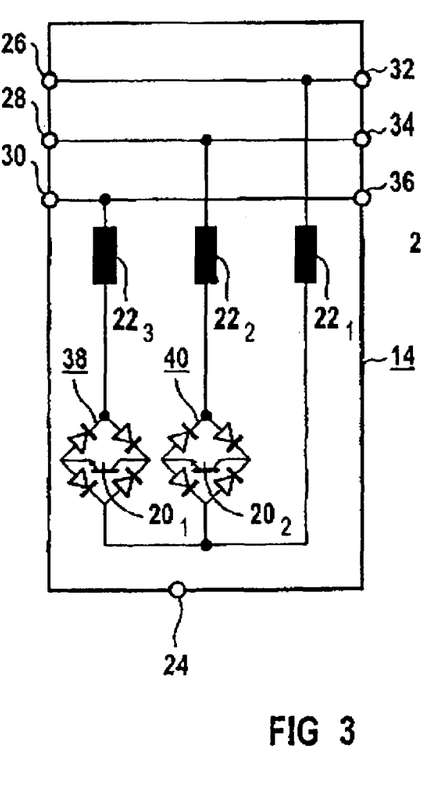
FIG. 3 is a circuit diagram of a second embodiment of the resistor unit of FIG. 1.

FIG. 3 shows a three-phase resistor unit 14 which, unlike the resistor unit 14 of FIG. 2, has three resistors $22_1$, $22_2$ and $22_3$ instead of the single resistor 22. In addition, two turn-off semiconductor switches $20_1$, and $20_2$ are provided, which are connected with the DC terminals of corresponding diode bridges 38 and 40. The diode bridges 38 and/or 40 each include four diodes, whereby a first AC side terminal is connected with a terminal of a resistor $22_3$, $22_2$ and a second AC side terminal is connected with a terminal of the resistor $22_1$. Accordingly, the resistors $22_1$, $22_2$ and $22_3$ are connected in a Star configuration, with the applied voltage distributed across two resistors $22_1$, $22_2$ or $22_3$. It should be noted that power is not always dissipated in the individual resistors during one power line period.

Figure 4:
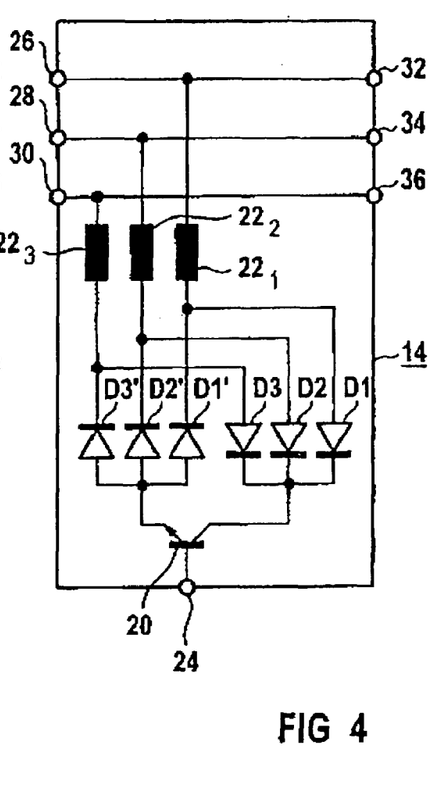
FIG. 4 is a circuit diagram of a third embodiment of the resistor unit of FIG. 1.

FIG. 4 shows an additional three-phase embodiment of the resistor unit 14 which, unlike the three-phase embodiment of FIG. 3, uses only three diodes D1, D2, D3 and D1', D2', D3', respectively, instead of the diode bridges 38 and 40. The resistor unit 14 depicted in FIG. 4 has a lesser number of components than the resistor unit 14 of FIG. 3.

The two embodiments of the resistor unit 14 according to FIGS. 3 and 4 advantageously eliminate low frequency harmonics, such as the fifth and seventh harmonic. The controller 4 then operates more smoothly, since the sinusoidal voltage across the resistor unit 14 has less distortion due to the absence of higher harmonics.

Figure 5:
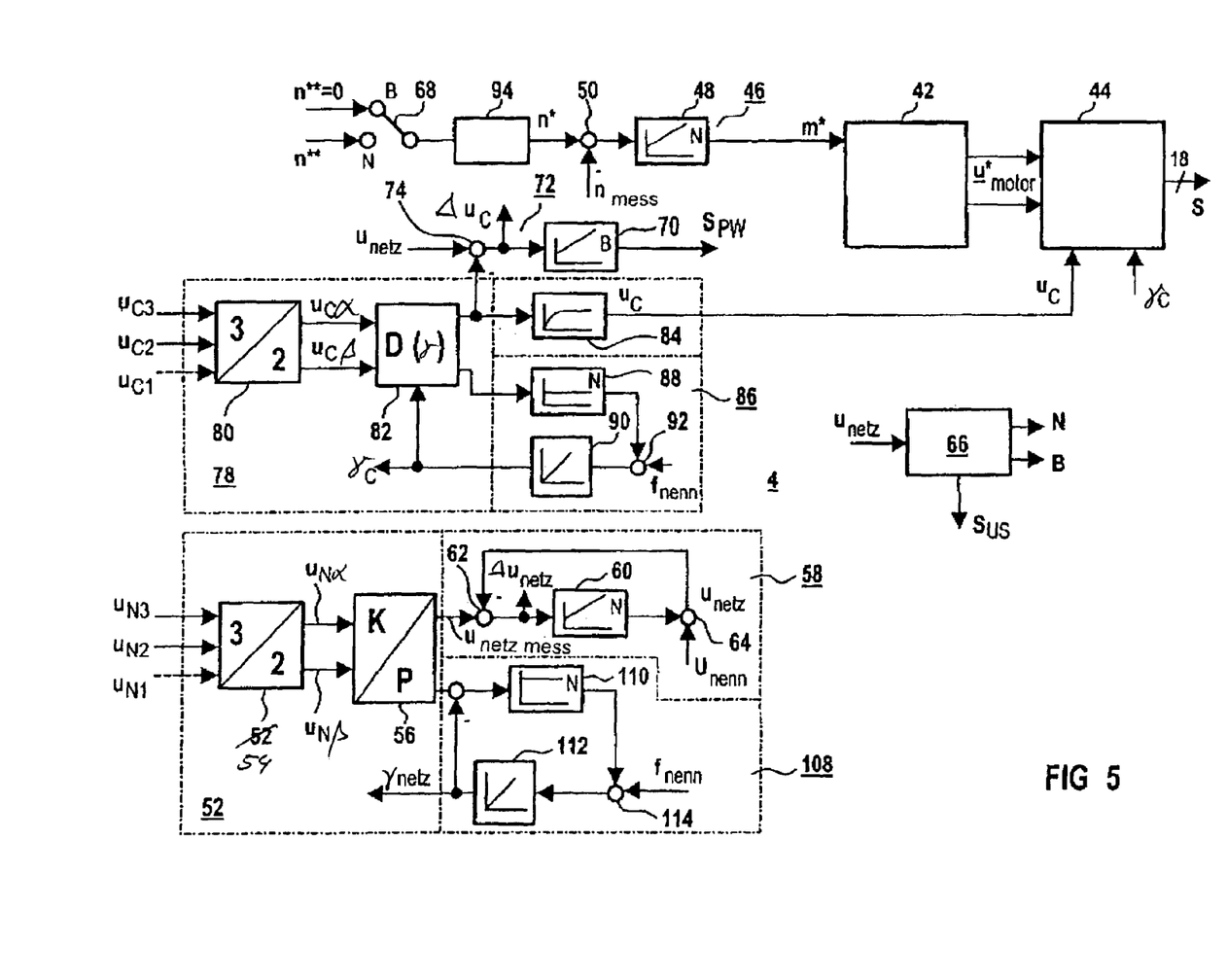
FIG. 5 is a functional block diagram of a first variation of a closed-loop control process of a matrix converter with a resistor unit.

FIG. 5 shows the functional block diagram of the controller 4 according to FIG. 1. The controller 4 includes a regulator 42 and a controller 44. A rotation speed control circuit 46 which supplies to the regulator 42 a desired torque value m* is connected upstream of the regulator 42. The rotation speed control circuit 46 consist of a rotation speed controller 48 and a comparator 50 which compares the measured actual rotation speed value $n_{mess}$ with a predetermined desired rotation speed value n*. The controller 4 also includes a device 52 for measuring an actual power line space vector $\vec{u}_{netzmess}$. The device 52 for measuring the actual power line space vector $\vec{u}_{netzmess}$ includes a coordinate transformer 54, with an additional coordinate transformer 56 connected downstream of the coordinate transformer 54. At least two measured value $u_{N2}$, $u_{N3}$ are supplied to the inputs of the coordinate transformer 54 of device 52. Alternatively, all three measured power line phase voltages $u_{N1}$, $u_{N2}$, $u_{N3}$ can be supplied to the input-side coordinate transformer 54 which transforms a three-phase system into an orthogonal two-phase system. The orthogonal components $u_{N\alpha}$ and $u_{N\beta}$ of an actual power line space vector $\vec{u}_{netzmess}$ that rotates with the power line frequency $f_N$ are present at the two outputs of the coordinate transformer 54. The additional coordinate transformer 56 connected downstream converts the rotating orthogonal components $u_{N\alpha}$ and $u_{N\beta}$ of the actual power line space vector $\vec{u}_{netzmess}$ into polar components $u_{netz\ mess}$ and phase angle $\gamma_{netzmess}$ of the actual power line space vector $\vec{u}_{netzmess}$.

A power line voltage monitoring device 58 is connected downstream of the device 52 for determining a power outage. The amplitude output of the device 52 for measuring an actual power line voltage space vector $\vec{u}_{netzmess}$ is connected with the input of the power line voltage monitoring device 58. The power line voltage monitoring device 58 includes a proportional-integral (PI) controller 60, a comparator 62 and an adder 64 for determining if the amplitude $u_{netz\ mess}$ of the actual power line voltage space vector $\vec{u}_{netzmess}$ falls below a predetermined lower tolerance limit. For this purpose, the amplitude deviation $\Delta u_{netz}$ is determined and supplied to a sequence controller 66. If the measured amplitude deviation $\Delta u_{netz}$ exceeds a predetermined value, then the sequence controller 66 switches from normal mode N to braking mode B. Based on a positive determination, the braking mode B is initiated by an output signal of the sequence controller 66. In other words, the switch 68 is switched over to the position B and all controllers identified with B are enabled.

The controllers identified with B only include a controller 70 of a voltage control circuit 72. The voltage control circuit 72 includes in addition to the controller 70 a comparator 74, whereby the amplitude $u_C$ of the measured actual capacitor voltage space vector $\vec{u}_{Cmess}$ is applied to the inverting input and the amplitude value of the determined actual power line voltage space vector $u_{netz}$ is applied to the non-inverting input of the comparator 74.

The controller 4 also includes a device 78 for measuring an actual capacitor voltage space vector $\vec{u}_{Cmess}$, which is determined by the device 78 from the measured capacitor voltages $u_{C2}$ and $u_{C3}$, or $u_{C1}$, $u_{C2}$ and $u_{C3}$, respectively, For this purpose, the device 78 includes a coordinate transformer 80 and a vector rotator 82 connected downstream of the coordinate converter 80. The coordinate transformer 80 generates from the measured capacitor voltages $u_{C1}$, $u_{C2}$ and $u_{C3}$ two orthogonal rotating voltage components $u_{C\alpha}$ and $u_{C\beta}$ which are converted to two stationery voltage components that depend on the phase angle $\gamma_C$ of the measured rotating actual capacitor voltage space vector $\vec{u}_{Cmess}$. The component representing the amplitude is smoothed by a smoothing filter 84. The other component is controlled to be zero by is also control circuit 86, which includes a controller 88, an integrator 90 and an adder 92. The circuit 86 delivers the smoothed phase angle $\gamma_C$ of the capacitor voltage $\vec{u}_{Cmess}$ Also supplied to the adder 92 is a nominal value $f_{Nenn}$ of the power line frequency $f_N$ for changing the phase angle $\gamma_C$ (rotating vector). The smoothed polar components $u_C$ and $\gamma_C$ of the actual capacitor space vector $\vec{u}_{Cmess}$ are supplied to the controller 44 which computes therefrom control signals $S_V$ for the matrix converter 2.

A ramp generator 94 is connected downstream of the switch 68, with the output of the ramp generator 94 being connected to an inverting input of the comparator 50 of the rotation speed control circuit 49. A desired rotation speed value n and a predetermined desired rotation speed value n=0 are applied to the two inputs of the switch 68. In normal mode identified by a letter N, the rotation speed value n** is applied to the ramp generator 94 which generates at its output a controlled rotation speed value n* which is continuously increased from zero to a predetermined value. In braking mode identified by the letter B, the predetermined rotation speed value n** is supplied to the input of the ramp generator 94, which causes the controlled rotation speed value n* to be continuously decreased from a predetermined value to zero. The switch 68 is controlled by the logic circuit 66. The logic circuit 66 enables the controller 70 of the voltage control circuit 72 after a power outage has been detected. An output signal of the comparator 74 is supplied to the input of the controller 70, A signal $S_{PW}$ is present at the output of the controller 70 which is then supplied to the control input 24 of the resistor unit 14. The control signal $S_{PW}$ controls the turn-off semiconductor switch 20 of the resistor unit 14 so that the average voltage across the resistor 22 and hence the power dissipated in the resistor 22 corresponds to the instantaneous braking power of the motor 16. In other words, the amplitude of the measured actual capacitor voltage space vector $\vec{u}_{Cmess}$ in braking mode B is controlled by the pulsed resistor 18. The drive is switched off when the motor 16 is stopped, i.e. when the measured actual rotation speed value $n_{mess}$ is equal to zero.

Figures 6, 6A:
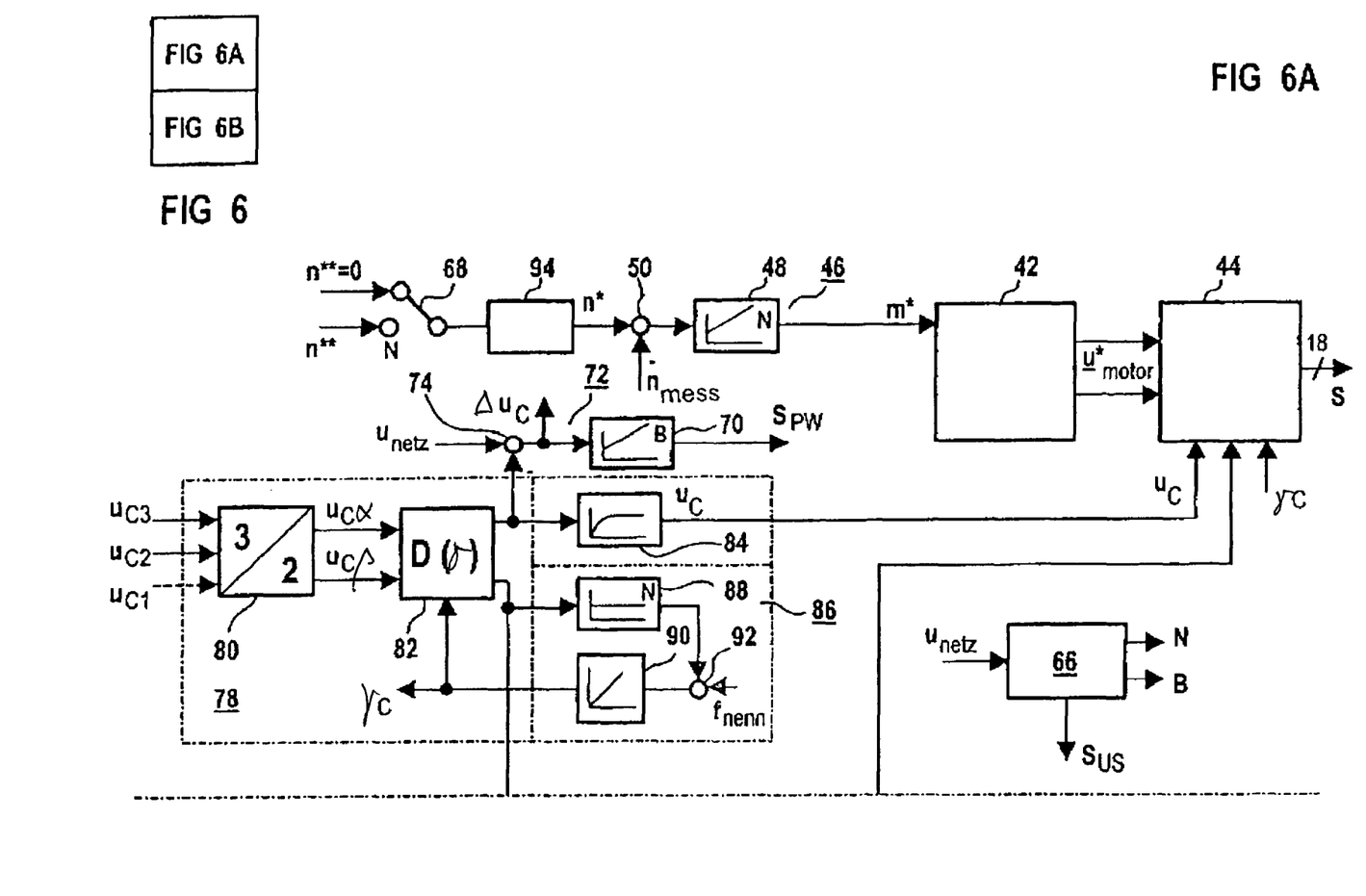
FIG. 6 is a functional block diagram of a second variation of a closed-loop control process of a matrix converter with a resistor unit.
Figure 6B:
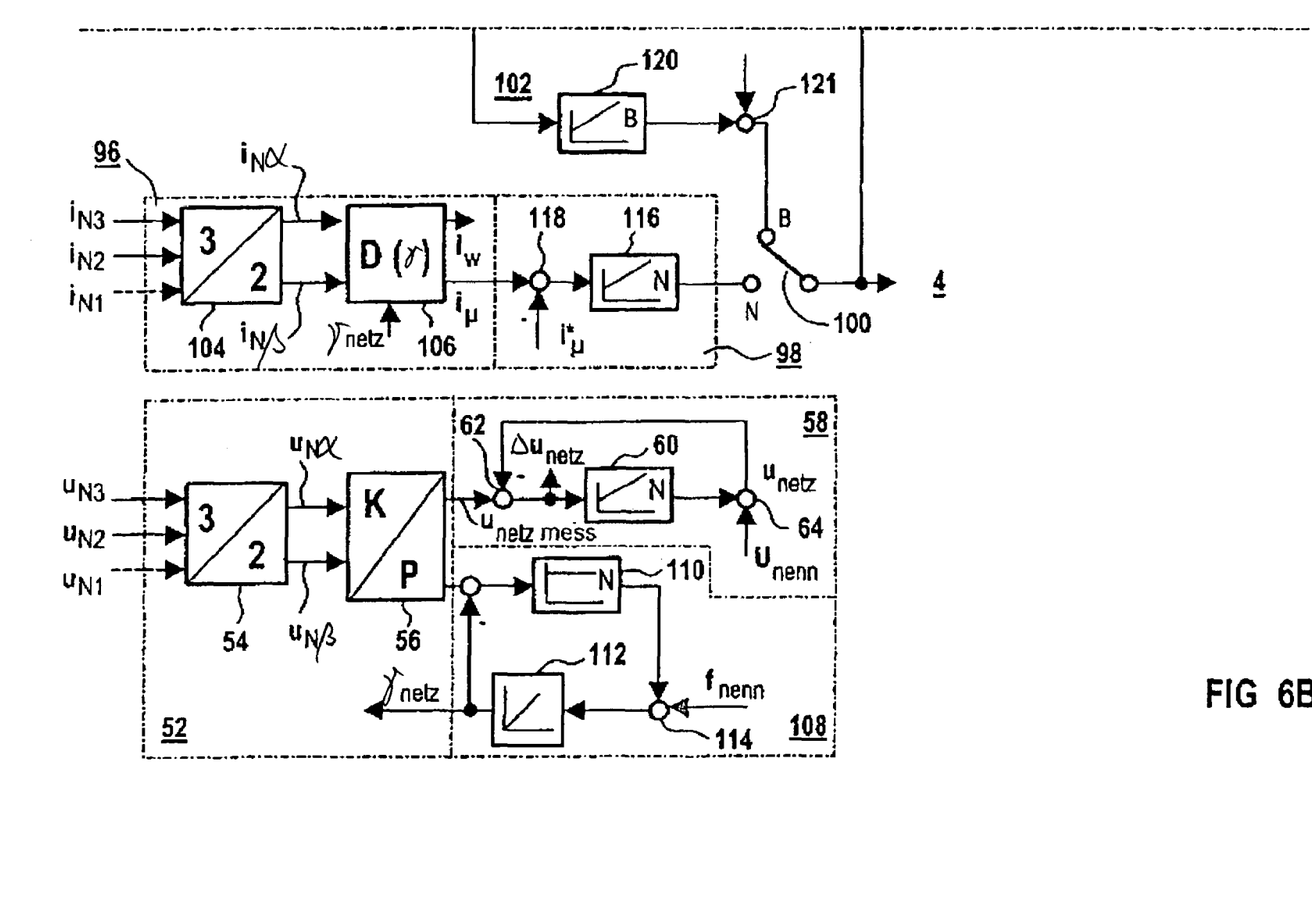

FIG. 6, split into FIGS. 6A and 6B for sake of clarity, shows a detailed functional block diagram of a second controller 4 of the matrix converter 2. Unlike the functional block diagram of FIG. 5, the functional block diagram of FIG. 6 has in addition a device 96 for measuring an actual power line current space vector $\vec{i}_{netzmess}$, a reactive current control circuit 98, a second switch 100 and a phase angle control circuit 102. This control device 4 can only be implemented by providing the control unit 44 with a control input for the controlled variable "power factor" in addition to the control variable inputs "amplitude" and "phase angle". The output of the second switch 100 is connected to the control input "power factor". The input of the switch 100 is connected to the output of the phase control circuit 102, whereby the other input of the switch 100 is connected to the output of the reactive current control circuit 98, which is connected with a reactive current output of the device 96 for measuring an actual power line current space vector $\vec{i}_{netzmess}$.

The input of the device 96 for measuring an actual power line current space vector $\vec{i}_{netzmess}$ includes a coordinate transformer 104 connected with a downstream vector rotator 106. The coordinate transformer 104 generates from the applied measured power line phase currents $i_{N1}$, $i_{N2}$ and $i_{N3}$ two orthogonal components $i_{N\alpha}$ and $i_{N\beta}$.

In order to prevent variations of the actual power line voltage space vector $\vec{u}_{netzmess}$ from affecting the projection of the actual power line current space vector $\vec{i}_{netzmess}$, the phase angle $\gamma_{netz}$ of the actual power line voltage space vector $\vec{u}_{netzmess}$ is smoothed in a second vector control circuit 108, which also includes a controller 110, an integrator 112 and an adder 114. The nominal value $f_{Nenn}$ of the power line frequency $f_N$ is applied to the input of the adder 114. The phase angle output of the vector control circuit 108 for smoothing a phase angle $\gamma_{netz}$ of an actual power line voltage space vector $\vec{u}_{netzmess}$ is associated with an angle control input of the device 96 for measuring an actual power line current space vector $\vec{i}_{netzmess}$.

Using the polar component phase angle $\gamma_{netz}$ of the actual power line voltage space vector $\vec{u}_{netzmess}$ and the vector rotator 106 of the device 96 for measuring an actual power line current space vector $\vec{i}_{netzmess}$, the two rotating orthogonal current components $i_{N\alpha}$ and $i_{N\beta}$ are transformed into two stationary current components $i_W$ and $i_\mu$ of a coordinate system that rotates with the rotating power line current actual voltage space vector $\vec{u}_{netzmess}$. I.e., the actual power line current space vector $\vec{i}_{netzmess}$ is projected onto the actual power line voltage space vector $\vec{u}_{netzmess}$. The current component $i_W$ represents a component in the direction of the actual power line voltage space vector $\vec{u}_{netzmess}$, whereas $i_\mu$ represents a component perpendicular to the direction of the actual power line voltage space vector $\vec{u}_{netzmess}$. The component $i_W$ is also referred to as effective current, whereas the component $i_\mu$ is referred to as reactive current. The measured reactive current $i_\mu$ of the actual power line current space vector $\vec{i}_{netzmess}$ is controlled in the downstream reactive current control circuit 98 to a predetermined desired reactive current value $i^*_\mu$. The reactive current control circuit 98 includes a controller 116 and a comparator 118. A desired reactive current value $i^*_\mu$ is applied to the inverting input of the comparator 118.

The phase angle control circuit 102 includes a controller 120 and a summing location 121. The summing location 121 is used to add a pre-control parameter for reducing the load on the controller 120. The output side of the summing location 121 is connected to an input of the switch 100. The second component of the measured and rotated actual capacitor voltage space vector $\vec{u}_{Cmess}$ is applied to the input of the phase angle control circuit 102.

The controller 4 of the matrix converter 2 is not different from the controller 4 of FIG. 5 with respect to the method for shutting down a drive during a power outage. The only difference is that the matrix converter 2 with the controller 4 of FIG. 6 can also regulate the input-side reactive current $i_\mu$. However, controlling the reactive current has no effect on the process for shutting down a drive during a power outage. In both Cases, the average voltage of the resistor unit 14 is controlled by the control signal $S_{PW}$ generated by the voltage control circuit 72 so that the power dissipated in the resistor unit 14 corresponds to the instantaneous braking power of the motor 16, with the desired rotation speed value $n^*$ being ramped down to zero.

Figure 7:
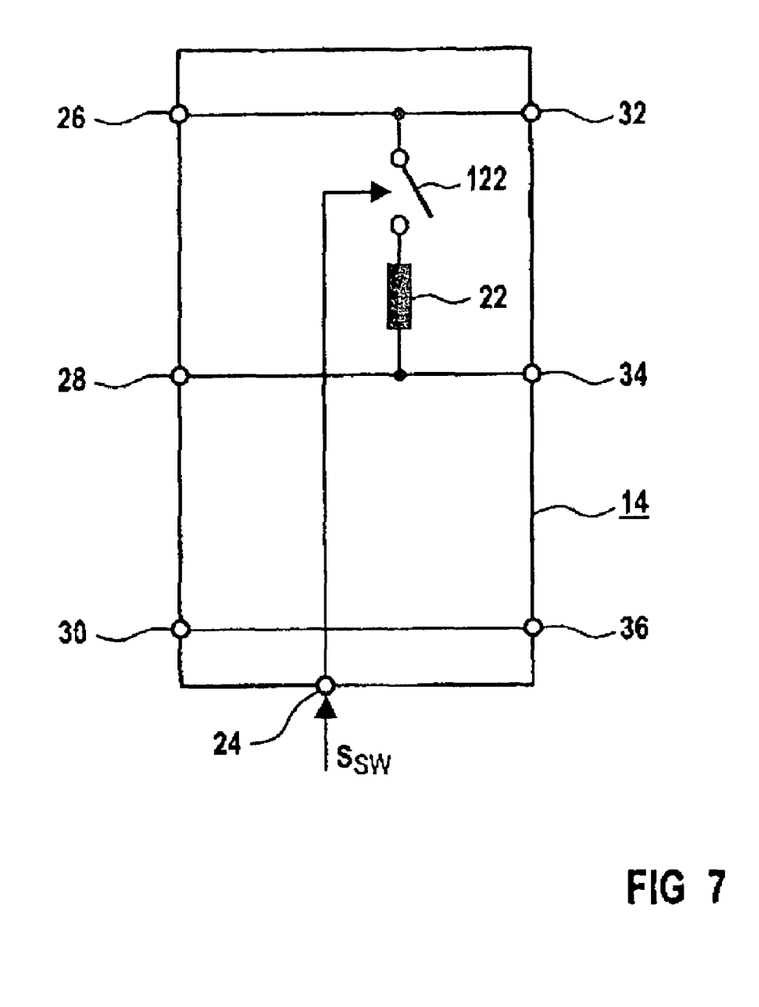
FIG. 7 is a circuit diagram of fourth embodiment of the resistor unit of FIG. 1.

FIG. 7 shows another embodiment of the resistor unit 14 in detail. The resistor unit 14 has a resistor 22 which is switched by contactor 122 between two input phases of the matrix converter 2. The resistor 22 of the resistor unit 14 is not pulsed, but is added after a power outage to assist in braking mode B. As a result, the voltage drop across the resistor 22 represents a DC voltage and not an AC voltage, so that the input voltage of the matrix converter 2, i.e., the actual capacitive voltage space vector $\vec{u}_{Cmess}$ in braking mode B does not have the power line frequency. When using this type of resistor unit 14, a modified controller 4 with the functional block diagram depicted in FIG. 8 must be employed.

Figure 8:
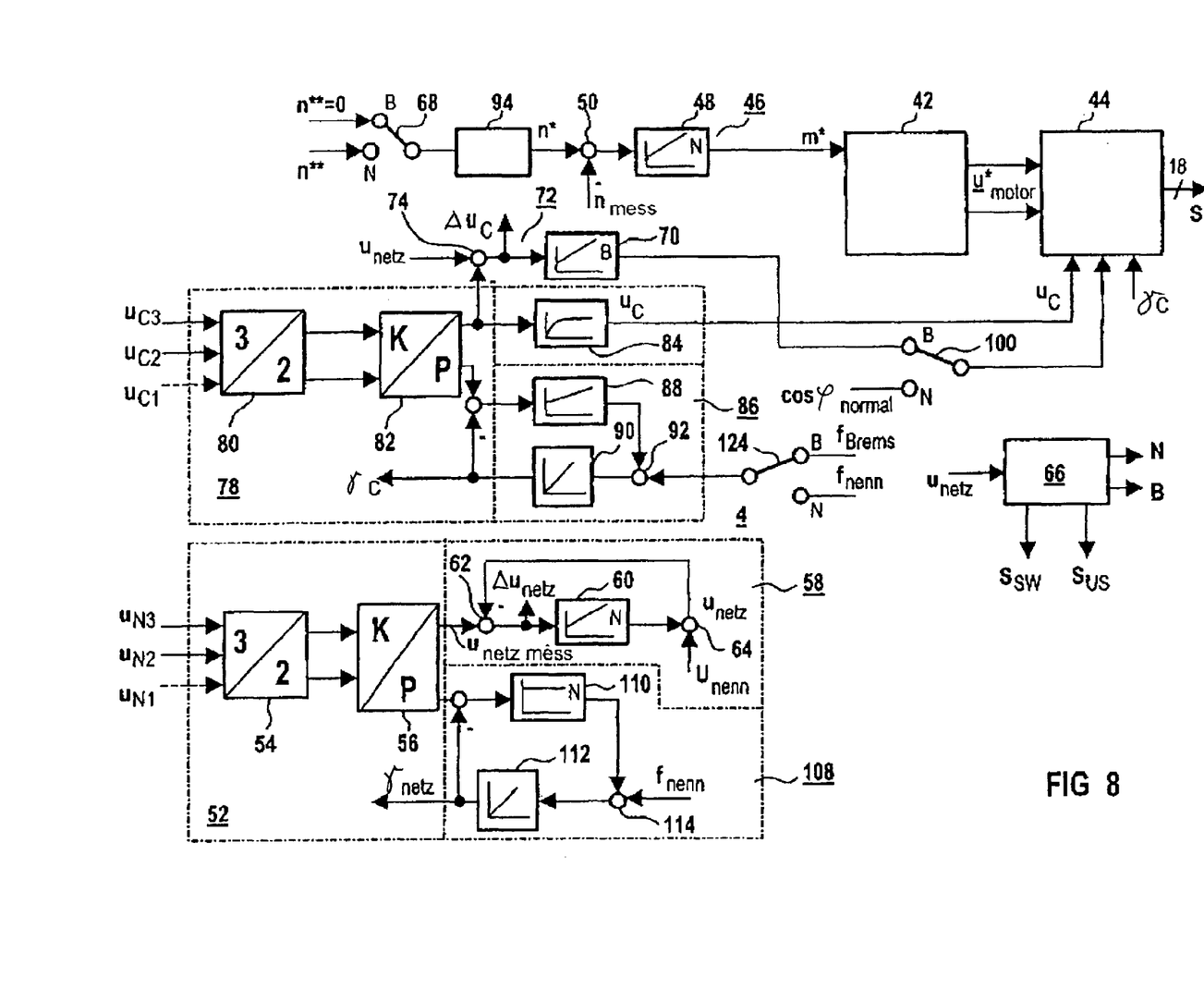
FIG. 8 shows a functional block diagram of a closed-loop control process of a matrix converter with the resistor unit of FIG. 7.

FIG. 8 shows a functional block diagram of an advantageous controller 4 of the matrix converter 2 with the resistor unit 14 depicted in FIG. 7. Unlike the unit depicted in the functional block diagram of FIG. 5, the controller 4 of FIG. 8 uses a controller 44 with a power factor control input in addition to an amplitude and phase angle control input. The output of the voltage control circuit 72, to which the control signal $S_{PW}$ is applied, is no longer connected with the control input 24 of the resistor unit 14, but rather with a first input of a second switch 100. A predetermined value $\cos\Phi_{normal}$ is applied to the second input of the switch 100 as a power factor control value, which in normal mode N is supplied to a power factor control input of the controller 44. In addition, an input of the adder 92 of the vector phase control circuit 86 is connected with an output of a third switch 124, with a predetermined frequency value $f_{brems}$ and $f_{Nenn}$ for the braking mode B and the normal mode N, respectively, being applied to the two inputs of the third switch 124. The sequence controller 66 also generates a signal $S_{SW}$ for the contactor 122 of the resistor unit 14 of FIG. 7. In the event of a power outage, the contactor 122 is closed by applying the control signal $S_{SW}$, so that the resistor 22 is connected between two input phase lines of the matrix converter 2.

Since the resistor 22 of the resistor unit 14 is not pulsed by a turn-off semiconductor switch 20, the output voltage of the matrix converter 2, i.e. the actual capacitive voltage space vector $\vec{u}_{Cmess}$ during braking mode B is a DC voltage and does not have the power line frequency. In other words, the actual capacitor voltage space vector $\vec{u}_{Cmess}$ does not rotate with the power line frequency $P_N$, but has a constant phase angle.

The voltage drop across the resistor 22 is adjusted via the phase angle of the actual capacitor voltage space vector $\vec{u}_{Cmess}$. If the actual capacitor voltage space vector $\vec{u}_{Cmess}$ is adjusted so that the phase-to-phase voltage of the two phases, between which the resistor 22 is connected, is equal to zero, then the voltage across the resistor 22 is also zero, and the resistor 22 does not dissipate power. The magnitude of the actual capacitor voltage space vector $\vec{u}_{Cmess}$ then corresponds to the value of the phase voltage of the third phase line. If the magnitude of the actual capacitor voltage space vector $\vec{u}_{Cmess}$ is adjusted so that the value of the phase voltage of the third baseline is zero, then the value of the phase-to-voltage of the two other phases is a maximum, so that the resistor 22 dissipates maximum power. The phase angle of the actual capacitor voltage space vector $\vec{u}_{Cmess}$, which in this case has an equivalent DC value, can be changed so as to vary continuously between these two end states. The actual capacitor voltage space vector $\vec{u}_{Cmess}$ is rotated via the output value of the voltage control circuit 72 which in braking mode B is applied at the power factor control input of the control unit 44. The control input affects the input-side reactive current i of the matrix converter 2 and therefore the rotation of the actual capacitor voltage space vector $\vec{u}_{Cmess}$. In braking mode B, the desired rotation speed value n* is simultaneously ramped to zero. The drive is switched off when the motor 16 stops.

Since the resistor unit 14 has only a single add-on resistor 22 and the controller 4 of a conventional matrix converter 2 requires only minor modifications, the latter embodiment represents a preferred embodiment for shutting down a drive with a matrix converter 2 during a power outage.

With the method of the invention, drives connected to a matrix converter 2 can be safely shut down during a power outage which has until now been impossible. Accordingly, a matrix converter employing the method of the invention and a resistor unit 14 is equivalent to a voltage intermediate circuit converter with a pulsed resistor.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for shutting down a drive employing a matrix converter during a power outage, with the matrix converter including a plurality of power input side commutation capacitors, a power input side switching unit, and a resistor unit, said method comprising the steps of:

in the event of a detected power outage, immediately opening the power input side switching unit to disconnect the matrix converter from the power supply, connecting the resistor unit to input terminals of the matrix converter in such a way that an amplitude of a voltage applied to the resistor unit is equal to an amplitude of a capacitor voltage space vector of the plurality of power input side commutation capacitors, and regulating a desired rotation speed value of the drive towards zero.

2. The method of claim 1, and further comprising the steps of forming from capacitor voltages, which are measured across the plurality of power input side commutation capacitors, two orthogonal voltage components of an actual capacitor voltage space vector, and smoothing the phase angle of the actual capacitor voltage space vector based on a nominal value of a power line frequency to determine from the two orthogonal voltage components the amplitude and phase angle of the actual capacitor voltage space vector.

3. The method of claim 1, and further comprising the steps of forming from measured phase voltages two orthogonal voltage components of an actual power line voltage space vectors, transforming the orthogonal voltage components into polar components having an amplitude and phase angle, comparing the amplitude of the actual power line voltage space vector with a nominal amplitude value and initiating a switch from normal mode to braking mode based on a detected deviation, and smoothing the phase angle of the actual power line voltage space vector with a nominal value of the power line frequency.

4. The method of claim 2, and further comprising the steps of comparing the amplitude of the actual capacitor voltage space vector with the amplitude of the actual power line voltage space vector before the outage to determine a deviation, and pulsing the resistor unit so that the deviation becomes zero.

5. A method for shutting down a drive employing a matrix converter during a power outage, with the matrix converter including a plurality of power input side commutation capacitors, a power input side switching unit, and a resistor unit, said method comprising the steps of:

in the event of a detected power outage, immediately opening the power input side switching unit to disconnect the matrix converter from the power supply, and controlling the matrix converter in braking mode in such a way that an amplitude of a voltage across the resistor unit is a maximum.

6. The method of claim 5, and further comprising the step of adjusting the amplitude of the voltage across the resistor unit by rotating a measured actual capacitor voltage space vector.

7. The method of claim 5, and further comprising the steps of forming from measured phase voltages two orthogonal voltage components of an actual power line voltage space vector, transforming the orthogonal voltage components into polar components having an amplitude and phase angle, comparing the amplitude of the actual power line voltage space vector with a nominal amplitude value and initiating a switch from normal mode to braking mode based on a detected deviation, and smoothing the phase angle of the actual power line voltage space vector with a nominal value of the power line frequency.

8. The method of claim 5, and further comprising the steps of forming from capacitor voltages measured across the plurality of power input side commutation capacitors two orthogonal voltage components of an actual capacitor voltage space vector, transforming the orthogonal voltage components into polar components, and comparing the amplitude of the actual capacitor voltage space vector with a nominal amplitude value to determine a deviation, and rotating the actual capacitor voltage space vector so that the deviation becomes zero.

9. A device for shutting down a drive employing a matrix converter during a power outage, wherein the matrix converter includes a controller, a plurality of power input side commutation capacitors, a power input side switching unit, and a resistor unit, said device comprising:
   a first unit for measuring an actual capacitor voltage space vector,
   a second unit for measuring an actual power line voltage space vector,
   a voltage control circuit having an input which is connected with an amplitude output of the first unit and another input which is connected with an amplitude output of the second unit, and an output which is connected with a control input of the resistor unit,
   a power line voltage monitoring device having an input which is connected with an amplitude output of the second unit, and an output which is connected with a control input of the power input side switching unit,
   a sequence controller having an input which is connected with the power line voltage monitoring device, and
   a switch having a control input connected to the output of the power line voltage monitoring device, and an output connected via a ramp generator with a setpoint input of a rotation speed control circuit of the controller of the matrix converter.

10. The device of claim 9, wherein the resistor unit comprises a series connection formed of a turn-off semiconductor switch and a resistor and having two terminals, and further comprising a plurality of diodes of which a first subset is connected with a first polarity between one terminal of the series connection and respective phase lines of the matrix converter, and a second subset is connected with an opposite polarity between the other terminal of the series connection and the respective phase lines of the matrix converter.

11. The device of claim 9, wherein the first unit comprises a coordinate transformer with a vector rotator connected downstream.

12. The device of claim 9, wherein the second unit comprises two coordinate converters connected in series.

13. The device of claim 9, and further comprising a smoothing device connected downstream of the amplitude output of the first unit.

14. The device of claims 9, and further comprising a vector phase control circuit connected downstream of the phase angle output of the second unit.

15. The device of claim 9 in the form of a signal processor.

16. A device for shutting down a drive employing a matrix converter during a power outage, wherein the matrix converter includes a controller, a plurality of power input side commutation capacitors, a power input side switching unit, and a resistor unit, said device comprising:
   a first unit for measuring an actual capacitor voltage space vector,
   a second unit for measuring an actual power line voltage space vector,
   a third unit for measuring an actual power line current space vector,
   a voltage control circuit having an input connected to an amplitude output of the first unit and with another input connected to an amplitude output of the second unit, and an output connected via a first switch with a control input of a control unit of the controller of the matrix converter,
   a second switch having an output connected via a ramp generator with a setpoint input of a rotation speed control circuit of the controller of the matrix converter,
   a power line voltage monitoring device having an input connected with an amplitude output of the second unit, and
   a sequence controller having an input connected with the power line voltage monitoring device and an output connected with control inputs of the first and second switches.

17. The device of claim 16, wherein the resistor unit comprises three resistors, a turn-off semiconductor switch and a plurality of diodes, and wherein each of the resistors is connected, on one hand, with a corresponding phase line of the matrix converter and, on the other hand, via a diode of a first polarity to a first terminal of the turn-off semiconductor switch, and via another diode of a second polarity to a second terminal of the turn-off semiconductor switch.

18. The device of claim 16, wherein the resistor unit comprises a series connection of a resistor and a contactor.

19. The device of claim 16, wherein the first unit comprises a coordinate transformer with a vector rotator connected downstream.

20. The device of claim 16, wherein the second unit comprises two coordinate converters connected in series.

21. The device of claim 16, and further comprising a smoothing device connected downstream of the amplitude output of the first unit.

22. The device of claims 16, and further comprising a vector phase control circuit connected downstream of the phase angle output of the second unit.

23. The device of claim 16 in the form of a signal processor.

24. A controller for a matrix converter device capable of safely shutting down a drive during a power outage, comprising:
   a plurality of power input side commutation capacitors,
   a power input side switching unit connected between the power supply and the commutation capacitors,
   a resistor unit,
   a first unit for measuring an actual capacitor voltage space vector,
   a second unit for measuring an actual power line voltage space vector,
   a voltage control circuit having an input which is connected with an amplitude output of the first unit and another input which is connected with an amplitude output of the second unit, and an output which is connected with a control input of the resistor unit,
   a power line voltage monitoring device having an input which is connected with an amplitude output of the second unit, and an output which is connected with a control input of the power input side switching unit,
   a sequence controller having an input which is connected with the power line voltage monitoring device, and
   a switch having a control input connected to the output of the power line voltage monitoring device, and an output connected via a ramp generator with a setpoint input of a rotation speed control circuit of the controller of the matrix converter.

25. A controller for a matrix converter device capable of safely shutting down a drive during a power outage, comprising:

a plurality of power input side commutation capacitors, a power input side switching unit connected between the power supply and the commutation capacitors, a resistor unit, a first unit for measuring an actual capacitor voltage space vector, a second unit for measuring an actual power line voltage space vector, a third unit for measuring an actual power line current space vector, a voltage control circuit having an input connected to an amplitude output of the first unit and with another input connected to an amplitude output of the second unit, and an output connected via a first switch with a control input of a control unit of the controller of the matrix converter, a second switch having an output connected via a ramp generator with a setpoint input of a rotation speed control circuit of the controller of the matrix converter, a power line voltage monitoring device having an input connected with an amplitude output of the second unit, and a sequence controller having an input connected with the power line voltage monitoring device and an output connected with control inputs of the first and second switches.

* * * * *